United States Patent [19]

Fox

[11] Patent Number: 4,673,502
[45] Date of Patent: Jun. 16, 1987

[54] FIXED FILTER DRUM AND MOVABLE SCRAPER

[75] Inventor: Robert J. Fox, Bowling Green, Ohio

[73] Assignee: Barnes Drill Co., Rockford, Ill.

[21] Appl. No.: 738,347

[22] Filed: May 28, 1985

[51] Int. Cl.[4] .................. B01D 41/04; B01D 29/38
[52] U.S. Cl. .................................. 210/413; 210/415;
210/416.1; 55/296; 209/389
[58] Field of Search ............ 210/396, 413, 415, 416.1;
55/296; 209/379, 385, 387, 389; 162/199, 274,
48, 272

[56] References Cited

U.S. PATENT DOCUMENTS

| | | | |
|---|---|---|---|
| 3,574,509 | 4/1971 | Zentis et al. | 210/107 |
| 3,959,140 | 5/1976 | Legras | 210/107 |
| 4,052,305 | 10/1977 | Arvanitakis | 210/413 |
| 4,146,484 | 3/1979 | Campbell | 210/396 |
| 4,273,655 | 6/1981 | Reid | 210/396 |
| 4,297,209 | 10/1981 | DeVisser et al. | 210/107 |
| 4,328,103 | 5/1982 | Kraeling, Jr. et al. | 210/413 |
| 4,360,037 | 11/1982 | Kendall | 210/413 |
| 4,396,511 | 8/1983 | Neumann | 210/413 |
| 4,421,645 | 12/1983 | Creps et al. | 210/260 |

FOREIGN PATENT DOCUMENTS

| | | | |
|---|---|---|---|
| 49746 | 10/1980 | European Pat. Off. | 210/413 |
| 114282 | 4/1899 | Fed. Rep. of Germany | 210/413 |
| 11886 | 8/1975 | Japan | 210/413 |
| 587966 | 12/1975 | U.S.S.R. | 210/413 |

Primary Examiner—Richard V. Fisher
Assistant Examiner—Wanda L. Millard
Attorney, Agent, or Firm—Leydig, Voit & Mayer

[57] ABSTRACT

A drum with a wedge-wire filter screen is submerged in a dirty coolant tank and filters machine tool coolant when vacuum is applied to the inside of the drum by means of a suction line at one end of the drum. The vacuum draws the coolant through the screen and into the inside of the drum for discharge through the suction line. During the filtering process, a filter cake builds up on the outside of the screen and must be periodically removed therefrom. To remove the filter cake while enabling the use of a simplified sealing structure between the drum and the suction line, the drum is supported in a rotationally stationary position, a scraper is supported to rotate around the drum, and the scraper is intermittently indexed to shave filter cake from the screen.

5 Claims, 7 Drawing Figures

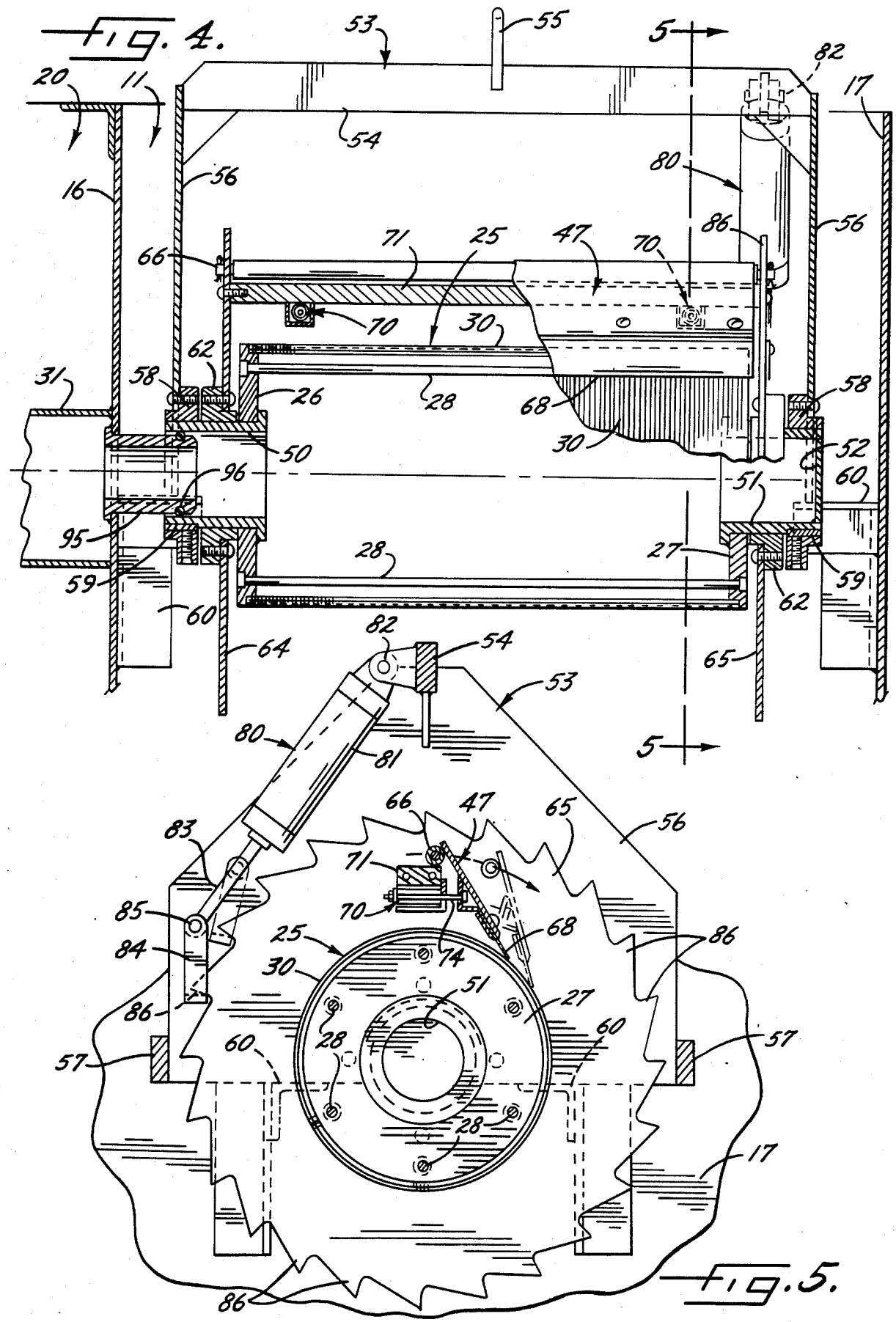

4,673,502

FIXED FILTER DRUM AND MOVABLE SCRAPER

BACKGROUND OF THE INVENTION

This invention relates to a filter for removing particles from a flow of dirty liquid such as machine tool coolant.

More particularly, the invention relates to a filter of the type in which a generally cylindrical drum is submerged in a tank adapted to receive the dirty liquid, the cylindrical wall of the drum being porous. When vacuum is applied to a suction line at one end of the drum, the liquid in the tank is drawn through the cylindrical wall, flows into the inside of the drum and then is discharged through the suction line.

The particles in the dirty liquid collect on the outside of the drum and form a cake which filters the liquid as the liquid passes through the drum. When the cake reaches a certain thickness and density, a portion of the cake must be scraped from the drum in order to maintain a sufficiently high flow of liquid through the drum.

A filter of this general type is disclosed in Creps et al U.S. Pat. No. 4,421,645. In that filter, the drum is rotatably mounted in the tank and is periodically indexed so that a fixed scraper adjacent the outer surface of the drum may remove a portion of the filter cake from a short arc of the drum and enable the flow through the drum to be maintained.

As explained in the Creps et al patent, it is desirable to be able to quickly disconnect the filter drum from the suction line in order that the drum may be lifted out of the tank for repair or for routine maintenance. Because the Creps et al drum both rotates relative to and is quickly disconnectable from the suction line, rather special and elaborate provisions must be made in order to maintain a liquid-tight seal between the drum and the suction line.

SUMMARY OF THE INVENTION

The general aim of the present invention is to provide a new and improved filter of the above general type in which the filter drum may be easily disconnected from the suction line and removed from the tank and, at the same time, may be connected to the suction line by a comparatively simple, long-lasting and trouble-free sealing structure.

A more detailed object of the invention is to achieve the foregoing by providing a filter in which a non-rotatable drum is supported in a stationary position in the tank and in which a scraper is uniquely rotated around the outside of the drum to remove filter cake therefrom. By virtue of the drum being stationary, the seal between the drum and the suction line need not accommodate rotation of the drum and thus the filter may utilize a less complex sealing structure which is subjected to less wear.

The invention also resides in the provision of novel means for mounting a scraper for rotation relative to a fixed drum and for periodically indexing the scraper around the drum to remove filter cake from successive short arcs of the drum.

These and other objects and advantages of the invention will become more apparent from the following detailed description when taken in conjunction with the accompanying drawings.

BRIEF DESCRIPTION OF THE DRAWINGS

FIG. 4 is an enlarged fragmentary cross-section taken substantially along the line 4—4 of FIG. 1.

FIG. 5 is a fragmentary cross-section taken substantially along the line 5—5 of FIG. 4.

DETAILED DESCRIPTION OF THE PREFERRED EMBODIMENT

Figure 1:
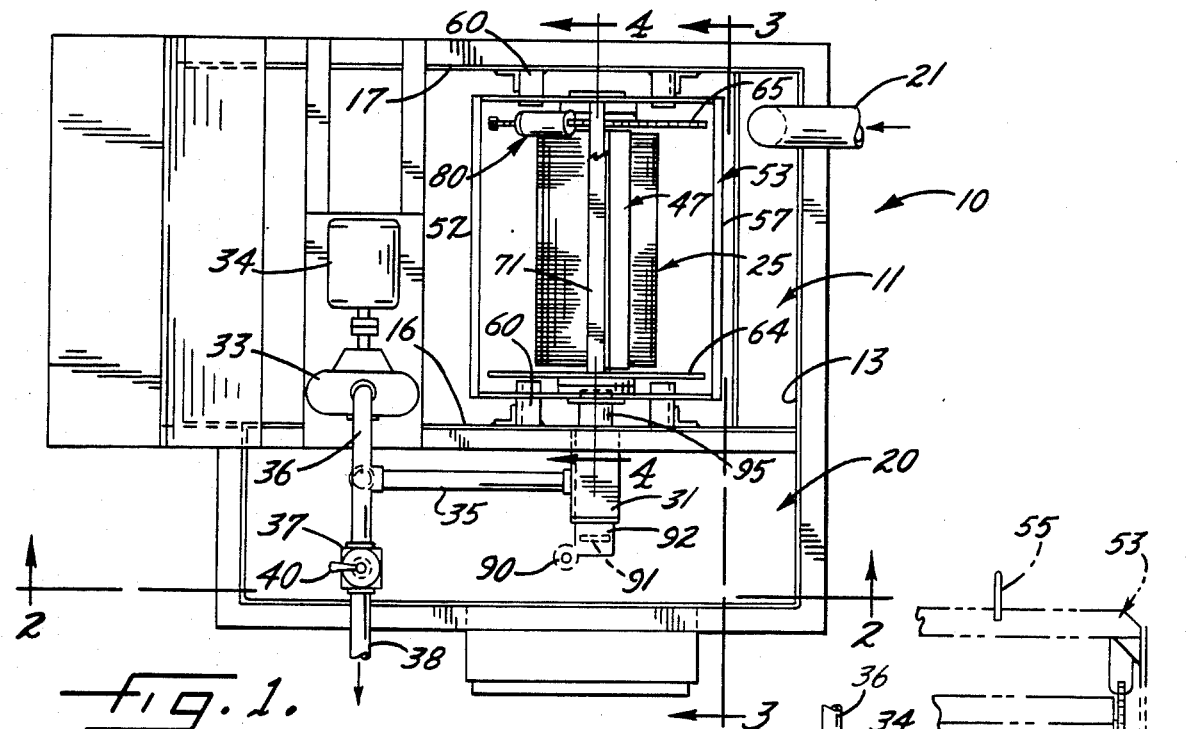
FIG. 1 is a top plan view of a new and improved filter incorporating the unique features of the present invention.

As shown in the drawings for purposes of illustration, the invention is embodied in a filter 10 for separating chips, particles and other contaminants from a flow of liquid such as dirty machine tool coolant and for supplying clean coolant to a system of one or more machine tools (not shown). The filter includes a dirty coolant tank 11 (FIGS. 1 to 3) having a pair of end walls 13 and 14, a bottom wall 15 and a pair of laterally spaced side walls 16 and 17. Mounted on the outside of the side wall 16 near the upper end portion thereof is a shallower clean coolant tank 20 which receives the coolant after the latter has been filtered. The side wall 16 is common to both tanks.

Figure 3:
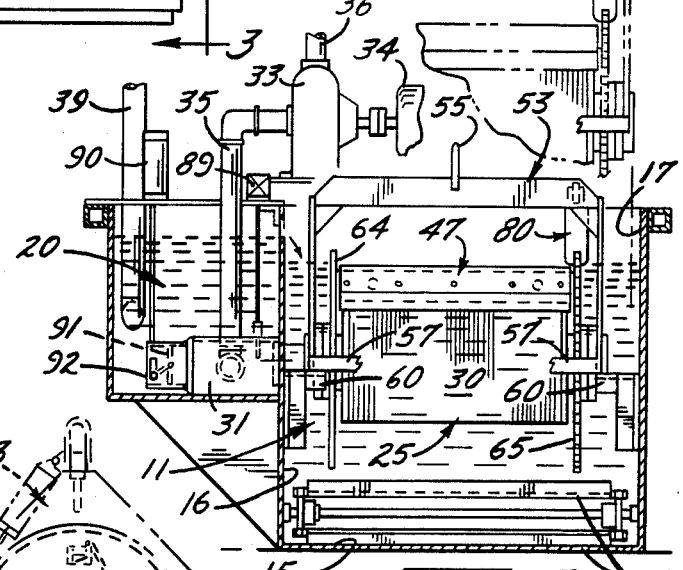
FIGS. 2 and 3 are fragmentary cross-sections taken substantially along the lines 2—2 and 3—3, respectively, of FIG. 1.
Figure 2:
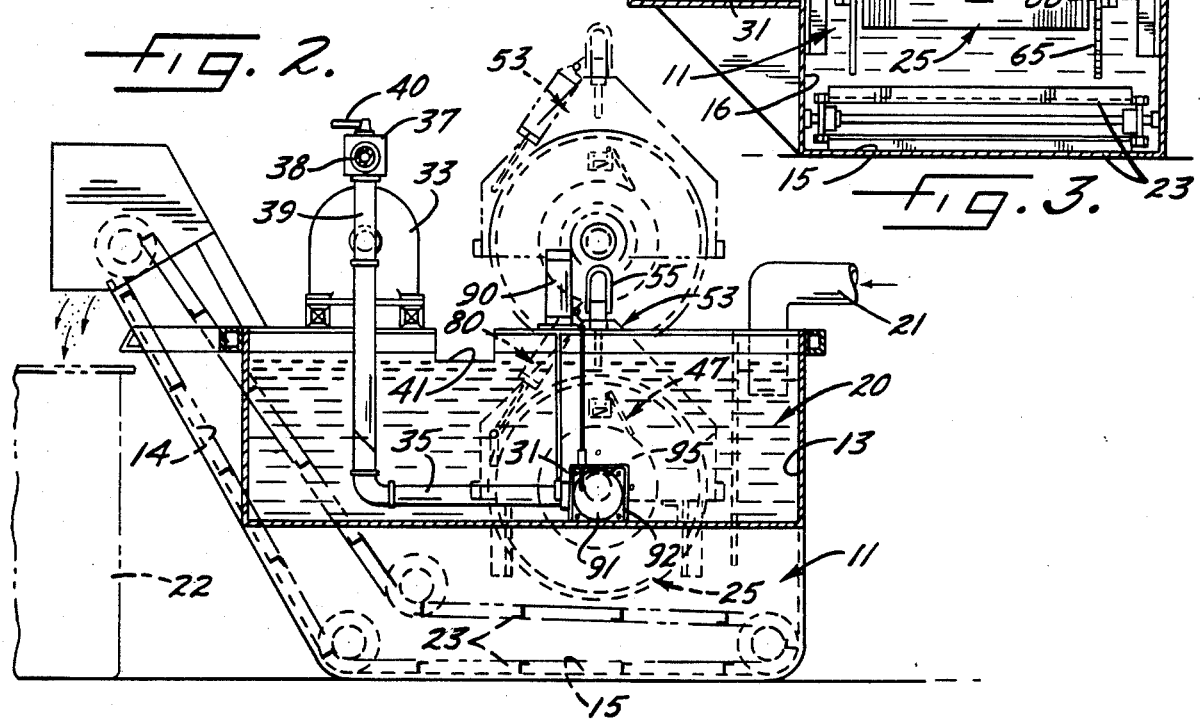

Dirty coolant is delivered to the dirty coolant tank 11 by way of a pipe 21 (FIGS. 1 and 3). Large chips and heavier particles settle to the bottom of the tank 11 and are removed therefrom and dumped into a collection bucket 22 by a conventional drag conveyor 23. Reference may be made to Estabrook et al U.S. Pat. No. 4,421,647 for a detailed disclosure of the construction and operation of a drag conveyor similar to the drag conveyor 23.

Small and fine particles which cannot be effectively removed from the dirty coolant by the drag conveyor 23 are separated from the dirty coolant by a filter drum 25 located inside the dirty coolant tank 11 and completely submerged in the dirty coolant therein. In the present instance, the filter drum is cylindrical, extends horizontally and includes a pair of end walls 26 and 27 (FIG. 4) connected together by longitudinally extending tie rods 28. The end walls support a cylindrical wall 30 which is porous so that coolant can pass through the cylindrical wall to the inside of the drum while fine particles collect on the outer surface of the cylindrical wall and thus are filtered from the coolant passing through the cylindrical wall to the inside of the drum.

A suction line 31 (FIGS. 1, 3 and 4) located within the clean coolant tank 20 and located adjacent the end wall 26 of the drum 25 communicates with the inside of the drum. When vacuum is applied to the suction line 31, the coolant in the dirty coolant tank 11 is sucked through the cylindrical wall 30 of the drum, and the clean filtered coolant is sucked from the inside of the drum through the suction line. Vacuum is applied to the suction line 30 by a pump 33 (FIG. 7) driven by a motor 34 and communicating with the suction line by way of a pipe 35. Clean coolant sucked into the pump through the pipe 35 is discharged from the pump by way of a pipe 36 which communicates with a tee 37. The substantial majority of the clean coolant is delivered to the machine tool system through a pipe 38 while the remainder of the clean coolant is directed to the clean coolant tank 20 by way of a bypass pipe 39. As will be explained subsequently, the clean coolant which is bypassed to the clean coolant tank 20 via the pipe 39 is used to supply the machine tool system with a continuous flow during those intervals when flow from the drum 25 to the suction line 31 is temporarily interrupted. The proportioning of the flow of clean coolant to the pipes 38 and 39 is regulated by a manually operable control valve 40 associated with the tee 37 while any excess coolant in the clean coolant tank 20 returns to the dirty coolant tank 11 through a weir 41 (FIG. 7) in the side wall 16.

In the present instance, the porous cylindrical wall 30 of the drum 25 comprises a wedge-wire screen formed by helically winding in a very tight fashion a length of wire of generally V-shaped cross-section, there being longitudinal reinforcing ribs (not shown) welded to the inside of the screen 30 and to the drum end walls 26 and 27. The details of the wedge-wire screen per se do not form part of the present invention and thus it will suffice to say that the screen collects particles on its outer side while allowing coolant to pass through the screen to the inside of the drum 25. As particles build up on the outer side of the screen 30, they form a porous cake 45 (FIG. 6) which in itself serves as a filter media to remove particles from additional coolant flowing to the inside of the drum.

As the filtering progresses, the filter cake 45 increases in thickness and density and tends to progressively restrict the flow of coolant through the screen 30. In order to maintain a flow rate sufficiently high to satisfy the machine tool system it is periodically necessary to remove a portion of the filter cake from the outer side of the screen so as to reduce the flow restriction created by the cake.

In accordance with the present invention, the filter cake 45 is removed from the screen 30 by mounting the drum 25 in a rotationally stationary position in the tank 11 and by periodically rotating a scraper 47 around the axis of the stationary drum to scrape the cake off of the screen. Because the rotatable scraper 47 allows the drum 25 to be mounted in a rotationally stationary position in the tank 11, the drum may be sealed to the suction line 31 by a very simple and durable non-rotary seal construction which enables the drum to be quickly and easily removed from the tank for maintenance and cleaning.

More specifically, the drum 25 is mounted in a stationary position in the tank 11 by two tubular hubs 50 and 51 (FIG. 4) extending through and welded rigidly to the drum end walls 26 and 27, respectively. The hub 50 communicates with the suction line 31 in a manner to be explained subsequently. The hub 51 is identical to the hub 50 except that its outboard end is closed tightly by a plate 52 in order to enable the suction line to create a vacuum within the drum.

The two hubs 50 and 51 are connected to a bail-like framework 53 which is used to lift the drum 25 out of the tank 11. Herein, the framework 53 includes an upper horizontal crossbar 54 (FIG. 4) extending longitudinally of the drum 25 and transversely of the tank 11 and equipped with a lifting hook 55. Depending from and welded rigidly to opposite ends of the crossbar 54 are generally triangular side plates 56 (FIGS. 4 and 5) whose lower ends are tied rigidly together by bars 57 extending transversely of the tank 11. Collars 58 (FIG. 4) are bolted rigidly to the lower end portions of the side plates 56, are fitted over the hubs 50 and 51, and are keyed rigidly to the hubs as indicated at 59. Thus, the hubs are prevented from rotating relative to the side plates.

Two spaced mounting brackets 60 (FIGS. 4 and 5) are welded to each of the side walls 16 and 17 of the tank 11. When the framework 53 with the attached drum 25 is lowered into the tank, the lower edges of the side plates 56 extend between and rest on the brackets 60. The weight of the drum and the framework holds the drum in a stationary position on the brackets.

To support the scraper 47 for rotation about the drum 25, collars 62 and 63 (FIG. 4) are rotatably supported on the hubs 50 and 51, respectively, inboard of the collars 58 and are bolted to large radially extending discs 64 and 65. The discs are generally circular and are spanned by a horizontal pivot rod 66 (FIGS. 4 and 6) which extends parallel to the axis of the drum 25. The scraper 47 is supported to pivot about the rod 66 and includes an elongated scraping blade 68 (FIG. 6) which extends along the length of the screen 30 of the drum. The blade is biased into contact with the screen 30 by a pair of spring units 70.

As shown in FIG. 4, the spring units 70 are located near the ends of the scraper 47 and are supported on the underside of a bar 71 which extends between the discs 64 and 65. Each spring unit includes a housing 73 (FIG. 6) slidably supporting a bolt 74 which is connected to the scraper 47. A coil spring 75 in the housing is telescoped over the bolt and is compressed between one end of the housing and a washer 76 on the other end of the bolt. Thus, the spring 75 acts to pull the bolt into the housing so as to bias the scraper clockwise about the pivot rod 66 and thereby pull the scraper into contact with the screen 30.

Figure 6:
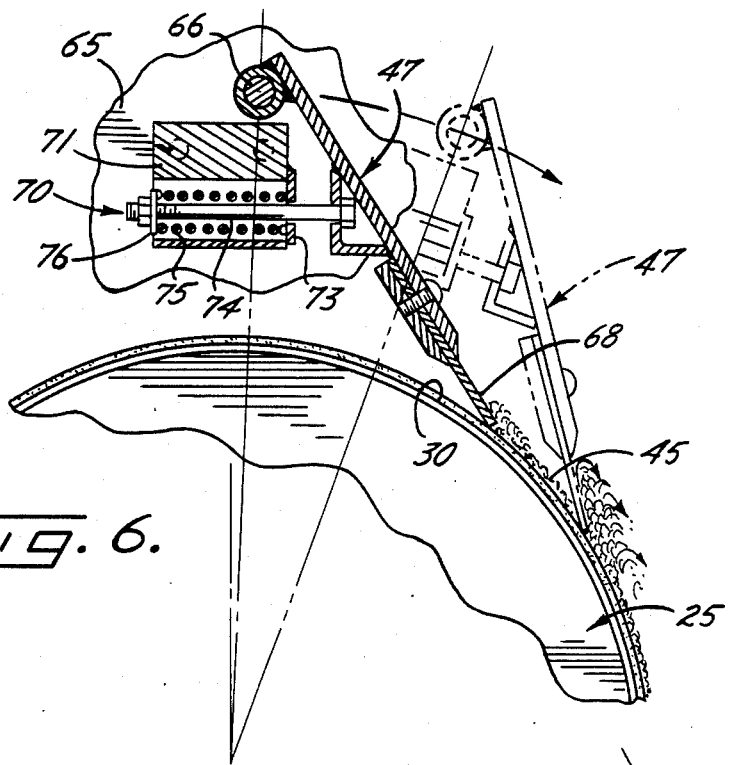
FIG. 6 is an enlarged view of certain parts shown in FIG. 5.

In keeping with the invention, the scraper 47 is periodically indexed through a short arc about the axis of the rotationally stationary drum 25 to cause the scraper to remove a section of filter cake 45 from the drum (see FIG. 6). For this purpose, provision is made of a reciprocating hydraulic actuator 80 (FIG. 5) having a cylinder 81 pivotally attached at 82 to one end portion of the crossbar 54. A rod 83 is slidable back and forth in the cylinder and carries a generally U-shaped stirrup or clevis 84, the latter being pivotally connected to the end of the rod as indicated at 85. Normally, the clevis 84 hangs from the rod 83 as shown in full lines in FIG. 5 and loops around one of twenty-four angularly spaced teeth 86 formed on the periphery of the disc 65.

When the cylinder 81 is pressurized to retract the rod 83 into the cylinder, the clevis 84 pulls on the engaged tooth 86 and causes the discs 64 and 65 and the scraper 47 to index clockwise through approximately fifteen degrees. The scraper may, for example, index from the position shown in solid lines in FIGS. 5 and 6 to the position shown in phantom lines. In so indexing, the scraper shaves a section of filter cake 45 from an arcuate section of the drum 25, such filter cake falling into the tank 11 for removal by the drag conveyor 23. When the rod 83 is subsequently advanced, the clevis 84 releases the engaged tooth 86 and drops into hooking relation with the following tooth preparatory to the next index cycle.

The scraper 47 normally is stationary and is indexed only when the filter cake 45 builds up sufficiently to unduly restrict the flow of coolant through the screen 30. The scraper eventually travels around the full 360 degrees of the drum and thus shaves successive short arcs of filter cake from the drum to reduce the restriction to flow through the drum.

Figure 7:
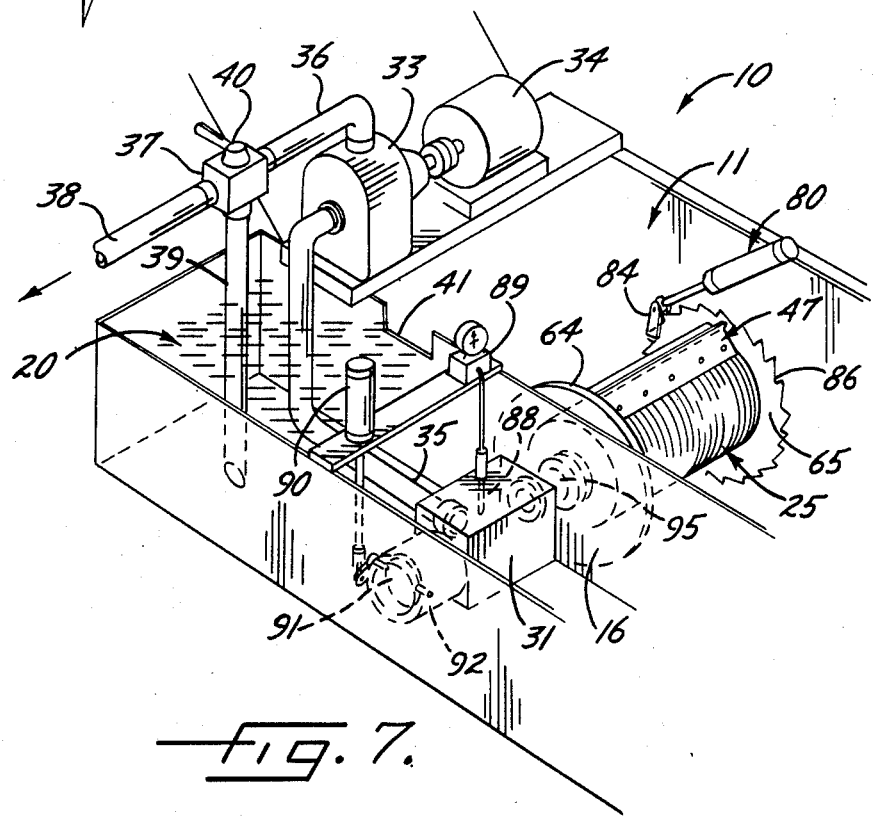
FIG. 7 is a fragmentary perspective view of the filter shown in FIGS. 1 to 3.

To control indexing of the scraper 47, a vacuum sensor shown schematically at 88 in FIG. 7 is disposed in the suction line 31. When flow through the drum 25 is restricted and the vacuum in the suction line builds up to a certain level, the sensor acts through a control 89 to cause an actuator 90 to open a valve 91 disposed in a pipe 92 which communicates with the pipe 35 via the suction line 31. When the valve 91 is opened, the pump 33 supplies the machine tool system by sucking coolant directly from the clean coolant tank 20 by way of the pipe 91 and the pipe 35 and relieves the vacuum inside the drum 25. With the vacuum relieved, the cake 45 may be scraped from the drum 25 and, after a time delay following opening of the valve 91, the cylinder 81 is pressurized to advance the rod 83 and index the scraper 47. The valve 91 then is re-closed and the rod 83 is retracted preparatory to the next index cycle, the next cycle being held out at least until the clean coolant tank has been refilled.

As stated above, an extremely simple sealing construction may be employed between the drum 25 and the suction line 31 because the drum is rotationally stationary. As shown in FIG. 4, a simple pipe 95 extends through the side wall 16 of the tank 11 and is welded tightly to the side wall. One end of the pipe 95 is disposed within and communicates with the suction line 31 while the other end portion of the pipe is telescoped into the hub 50 and communicates with the inside of the drum 25. A simple 0-ring seal 96 is fitted in a groove around the outer side of the pipe 95 and seals against the inside of the hub 50 to seal the drum relative to the dirty coolant tank 11.

To install the drum 25 in the tank 11, the drum and framework 53 may be positioned above the tank closely adjacent the side wall 17 thereof as shown in phantom in FIG. 3, the hub 50 being spaced longitudinally from the pipe 95 when the drum is so positioned. After the drum has been lowered into the tank, it is necessary only to shift the drum horizontally toward the side wall 16 to cause the hub 50 to telescope slidably over the pipe 95 and establish a seal. Removal of the drum for cleaning purposes or the like may be effected by shifting the drum horizontally in the reverse direction and then lifting the drum out of the tank. Because the drum is rotationally stationary, the sealing members 50, 95 and 96 need only accommodate occasional sliding motion and are not subjected to any rotary motion or any continuous axial force. Thus, the sealing members may be of simple construction and may experience a long and trouble-free service life.

I claim:

1. A filter for removing particles from dirty liquid, said filter comprising a tank for receiving a flow of dirty liquid, a generally cylindrical drum disposed within said tank and submerged in the dirty liquid therein, said drum having a porous cylindrical wall and having two ends, a suction line connected to one end of said drum and communicating with the inside of the drum, means for applying a vacuum to said suction line to cause the dirty liquid in said tank to flow through the cylindrical wall of said drum to the inside of said drum and then to flow out of said drum through said suction line, particles in such liquid collecting on the outer surface of the drum and forming a cake for filtering the liquid, and a scraper for periodically removing a portion of said cake from said drum, said filter being characterized in that said drum is non-rotatably mounted in said tank, said scraper being mouted to rotate about the longitudinal axis of the drum and around the entire outer circumference of said drum and being operable when rotated to remove a portion of said cake from said drum, a pair of discs attached to the ends of said scraper and rotatable relative to said drum about the longitudinal axis thereof, teeth formed on and spaced angularly around the periphery of one of said discs, and indexing means for intermittently rotating said scraper about the axis of said drum, said indexing means comprising a member engageable with successive teeth and operable when actuated to index said discs and said scraper through one step, and means for periodically indexing said member.

2. A filter as defined in claim 1 further including means mounting said scraper on said disc to swing about a pivot axis extending parallel to the longitudinal axis of said drum, and resiliently yieldable means biasing said scraper to swing about said pivot axis and into contact with said drum.

3. A filter as defined in claim 1 including a statonary pipe extending through one wall of said tank and having one end communicating with said suction line, the other end portion of said pipe being telescope slidably with and being sealed to said one end of said drum.

4. A filter for removing particles from dirty liquid, said filter comprising a tank for receiving a flow of dirty liquid, a generally cylindrical drum disposed within said tank and submerged in the dirty liquid therein, said drum having a porous cylindrical wall and having two ends, a suction line connected to one end of said drum and communicating with the inside of the drum, means for applying a vacuum to aid suction line to cause the dirty liquid in said tank to flow through the cylindrical wall of said drum to the inside of said drum and then to flow out of said drum through said suction line, particles in such liquid collecting on the outer surface of the drum and forming a cake for filtering the liquid, and a scaper for periodically removing a portion of said cake from said drum, said filter being characterized in that said drum is nonrotatably mounted in said tank, means supporting said scraper adjacent the outer surface of the drum and mounting said scraper for rotation about the longitudinal axis of the drum and around the entire outer circumference of said drum, means for intermittently indexing said scraper through a relatively short arc about said axis, said scraper being operable when index to remove a portion of said cake from a correspnding arc of said drum and to cause the removed cake to fall into said tank, and a stationary pipe extending through one wall of said tank and having one end communicating with said suction line, the other end portion of said pipe being telescoped slidably with and being sealed to said one end of said drum.

5. A filter for removing particles from dirty liquid, said filter comprising a tank for receiving a flow of dirty liquid, a generally cylindrical drum disposed within said tank and submerged in the dirty liquid therein, sad drum having a porous cylindrical wall and having two ends, a suction line connected to one end of said drum and communicating with the inside of the drum, means for applying a vacuum to said suction line to cause the dirty liquid in said tank to flow through the cylindical wall of said drum to the inside of said drum and then to flow out of said drum through said suction line, particles in such liquid collecting on the outer surface of the drum and forming a cake for filtering the liquid, and a scraper for periodically removing a portion of said cake from said drum, said filter being characterized in that said drum is non-rotatable mounted in said tank, said scraper being mounted to rotate about the longitudinal axis of the drum and around the entire outer circumference of said drum and being operable when rotated to remove a portion of said cake from said drum, and means for rotating said scraper about the axis of said drum, and a stationary pipe extending through one wall of said tank and having one end communicating with said suction line, the other end poriton of said pipe being telescoped slidably with and being sealed to said one end of said drum.

* * * * *